United States Patent [19]

Maruyama et al.

[11] Patent Number: 4,996,765
[45] Date of Patent: Mar. 5, 1991

[54] APPARATUS FOR SECURELY FASTENING BOOT TO DRIVING SHAFT, AND DRIVING SHAFT POSITION ALIGNMENT DEVICE FOR USE THEREIN

[75] Inventors: Iwao Maruyama; Kimitake Uzuyama, both of Sayama, Japan

[73] Assignee: Honda Giken Kogyo Kabushiki Kaisha, Tokyo, Japan

[21] Appl. No.: 402,582

[22] Filed: Sep. 5, 1989

[30] Foreign Application Priority Data

Sep. 8, 1988 [JP] Japan ............................... 63-223445

[51] Int. Cl.⁵ ............................................ B23P 17/00
[52] U.S. Cl. .................................................... 29/795
[58] Field of Search .................. 29/795, 796, 888.08, 29/897.2, 429, 430, 1.01, 700; 464/173, 175

[56] References Cited

U.S. PATENT DOCUMENTS

| 3,657,794 | 4/1972 | Palumbo et al. | 29/429 |
| 4,200,966 | 5/1980 | Nakao et al. | 29/243.5 |
| 4,559,025 | 12/1985 | Dore | 464/175 |
| 4,738,013 | 4/1988 | Yamashita et al. | 29/700 X |
| 4,786,272 | 11/1988 | Baker | 464/175 |
| 4,895,550 | 1/1990 | Baker | 464/175 |

FOREIGN PATENT DOCUMENTS 58-34710  7/1983 Japan .
58-146630 10/1983 Japan .

Primary Examiner—Timothy V. Eley
Assistant Examiner—Frances Chin
Attorney, Agent, or Firm—Armstrong, Nikaido, Marmelstein, Kubovcik & Murray

[57] ABSTRACT

An apparatus for securely fastening a boot to a driving shaft in which a boot is fitted over each of both ends of driving shaft so as to cover an open end of a joint attached to each end of the shaft, and a band is wound around each of both ends of the boot by a band winding device so as to fasten both ends of the boot securely to the shaft body and the joint respectively, the apparatus comprising an assembly line along which the driving shaft is conveyed; a conveying jig movable along the assembly line, conveying jig having clampers for clamping a shank portion of each of the joints and the shaft body; the assembly line having a plurality of assembly stations, each of the assembly stations having at least one band winding device for winding a band around each of the predetermined end portions of the boot, and a positioning device for positioning the conveying jig at the assembly station; a loader device for setting the driving shaft on the conveying jig standing in a charging station located at a starting end of the assembly line; and a position alignment device for positionally aligning the driving shaft so as to have each of the joints and each of the boots positioned respectively at the predetermined positions with respect thereto, so that the driving shaft positionally so aligned by the position alignment device can be set on the conveying jig in aligned state through the loader device.

2 Claims, 12 Drawing Sheets

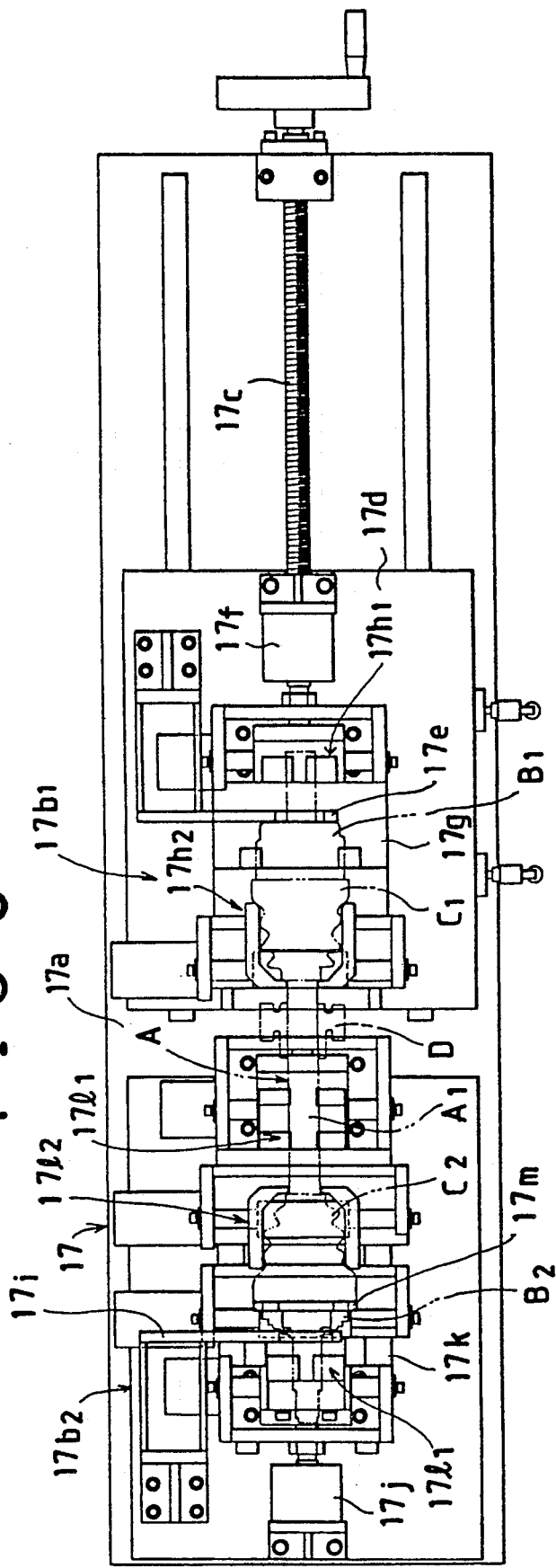

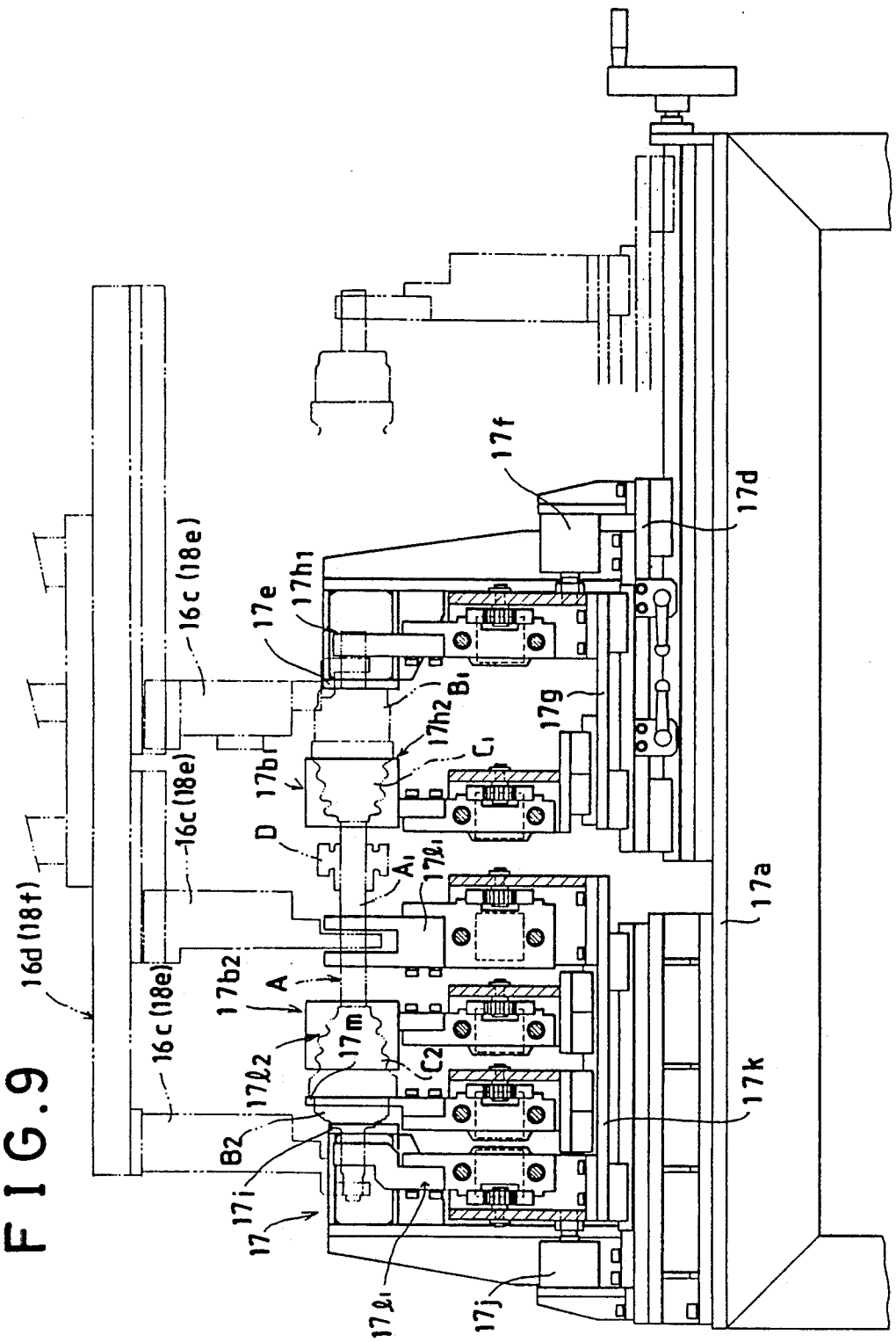

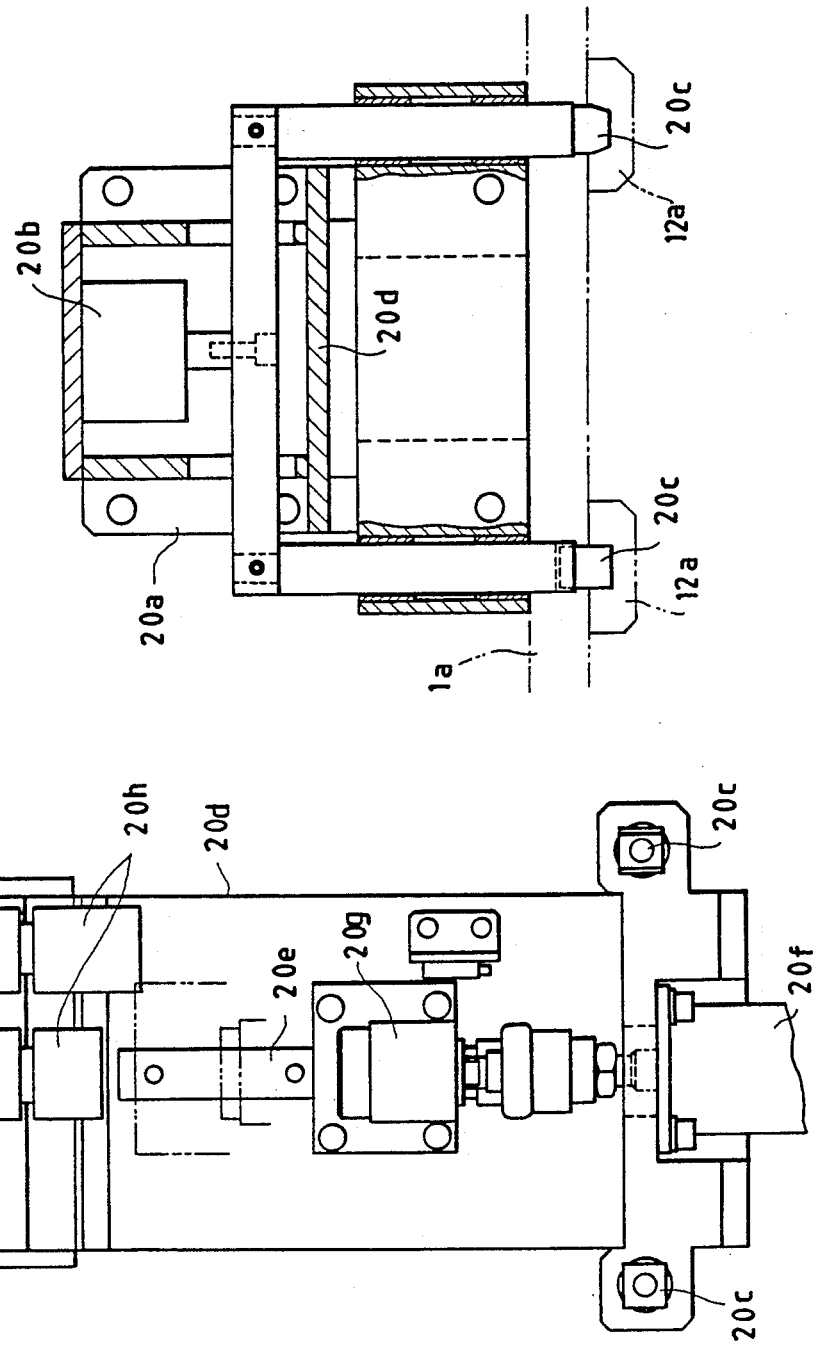

APPARATUS FOR SECURELY FASTENING BOOT TO DRIVING SHAFT, AND DRIVING SHAFT POSITION ALIGNMENT DEVICE FOR USE THEREIN

This invention relates to an apparatus for securely fastening a boot to a driving shaft wherein the boot is fitted over each of both ends of a vehicular-use driving shaft in such a manner as to cover an open end of a joint such as a constant velocity one attached to each end of the shaft, the boot being wound tightly therearound with a band and thus fastened securely in place, and to a position alignment device for a driving shaft for use therein.

Japanese Examined Patent Application No. Tokko-sho No. 58-34710 and the Japanese Unexamined Utility Model Registration Application Publication No. Jikkai-sho No. 58-146630 disclose a band winding device for winding a band around a boot and thus fastening the boot securely in place.

Generally, for fitting a boot over the driving shaft, the diametrically larger end thereof has to be securely fastened to the constant velocity joint attached to the shaft and the diametrically smaller end thereof to the shaft body. Conventionally, this is done in such a manner that a worker manually adjusts position of the driving shaft set in the band winding device and then the diametrically larger and smaller ends of each of the boots fitted over each of both ends of the shaft are securely fastened in place successively.

When the operation to fasten the boots securely in place is performed while adjusting position of the driving shaft as described in the foregoing, there naturally arises the problem of poor work efficiency. To improve the work efficiency for higher productivity, it would be desirable to have an assembly line having a plurality of assembly stations, each of the assembly stations being provided with a band winding device for winding a band around each of predetermined end portions of the boot and the driving shaft be conveyed successively to each of those assembly stations, so that the boot-fastening operation can be carried out in a flow process.

Now, it should be noted that at least one of the joints attached to both ends of the driving shaft is slidable in the axial direction with respect to the shaft body and the position of the diametrically larger end of the boot fitted over the joint changes with a sliding movement of the joint, or the boot is sometimes not fitted accurately over the shaft body and the joint due to inaccurate positioning thereof. Therefore, how the joint and the boot can be positioned correctly for this operation is a problem that has to be solved for automation of such a fastening operation.

The present invention has for its object to provide a boot15 fastening operation through solution of that problem and in addition a position alignment device for a driving shaft for use in said boot-fastening operation.

SUMMARY OF THE INVENTION

To achieve the above object, the present invention provides an apparatus for securely fastening a boot to a driving shaft in which a boot is fitted over each of both ends of a vehicular-use driving shaft in such a manner as to cover an open end of a joint attached to each end of the shaft, and a band is wound around each of both ends of the boot by means of a band winding device so as to fasten both ends of the boot securely to the shaft body and the joint respectively. An assembly line is provided along which the driving shaft is conveyed by a conveying jig while held thereon. The conveying jig has clampers for clamping the shank portion of each of the joints and the shaft body. The assembly line is provided with a plurality of assembly stations, each of the assembly stations being provided with a band winding device for winding a band around each of the predetermined end portions of the boot and with a positioning device for positioning the conveying jig. A loader device is provided for setting the driving shaft on the conveying jig standing in the charging station location at the starting end of the assembly line. A position alignment device is provided for alignment of the position of the components thereof so as to have each of the joints and each of the boots positioned respectively at the predetermined positions with respect to the shaft so that the driving shaft positionally so aligned by the position alignment device can be set on the conveying jig in the aligned state.

In this case, it is preferable that the conveying jig is provided with a vertically movable jig frame, the jig frame carrying clampers. The positioning device is provided with a lifter for moving the jig frame upward and downward.

It is also preferable the position alignment device include on a machine frame, a first unit for positioning the joint and the boot on one end portion of the driving shaft and a second unit for positioning the joint and the boot on the other end portion thereof. Each of both units comprise a stopper for receiving and stopping an axially outer end surface of each of the joints at the predetermined position, a first clamper for clamping the shank portion of each of the joints and a second clamper for clamping each of the boots. The first clamper is movable toward and away from the stopper. The second clamper is movable toward and away from the first clamper, both moving in the axial direction of the driving shaft. It is further preferable that the foregoing unit is provided with a boot stopper for receiving and stopping the end surface of the diametrically larger end of the boot fitted over the joint.

For carrying out the position alignment operation, the shank portion of each of the joints is clamped by the first clamper of each of the units and then each first clamper is moved outward in the axial direction. According to this operation, the axially outer end surface of each of the joints comes to abut against the stopper of each of the units so as to position each of the joints at the predetermined position respectively. Next, each of the boots is clamped by the second clamper and is moved outward in the axial direction. According to this operation, each boot is pushed and moved toward the corresponding joints and then the stepped portion on the inner periphery of the diametrically larger end portion of each of the boots comes to abut against the open end of each of the joints so as to position each of the boots at the predetermined position with respect to each of the joints positioned earlier and now serving as the reference. This eliminates possible defective fitting of each boot over the corresponding joints and the shaft body that could arise from inaccurate positioning of each boot.

When it is feared that the foregoing stepped portion of the boot may get moved too far along the outer periphery of the open end portion of the joint, a boot stopper is provided designed to receive and stop the end surface of the diametrically larger end portion of the boot so as to have the boot positioned at the predetermined position.

According to the present invention, the driving shaft positionally aligned as described in the foregoing is set on the conveying jig standing in the charging station through the loader device while being kept in the aligned position, so that the positioned accuracy of each of the joints and boots with respect to the conveying jig is secured. In this case, the conveying jig holds the driving shaft in place by clamping it at the shaft body and the shank portion of each of the joints by the clampers it has, so that the shaft body and the joints are kept steadfast not to cause the diametrically smaller and larger end portions of the boot to become positionally misaligned after the shaft is set on the conveying jig. Thus, simply by positioning the conveying jig by the positioning device at each assembly station, each of the predetermined end portions of the boot is accurately aligned in position with the corresponding band winding device disposed at each of the assembly stations and the diametrically smaller and larger end portions of each of the boots are wound around tightly by a band and fastened securely in place successively at a plurality of the assembly stations.

It is possible to arrange it such that the conveying jig may be movable upward and downward at each of the assembly stations so as to move the driving shaft upward and downward for connection with and disconnection from each of the band winding devices there. Whereas such an arrangement as just mentioned above does inevitably make the structure of a conveying means for the conveying jig complex, the present invention provides the boot-fastening apparatus wherein the driving shaft ca be moved upward and downward through the jig frame of the conveying jig by a lifter provided on the positioning device. In this manner, the main body of the conveying jig is only required to move rectilinearly along the assembly line. This leads to a comparatively simplified structure of the conveying means.

BRIEF DESCRIPTION OF THE DRAWINGS

The above and other objects and the attendant advantages of the present invention will become readily apparent by reference to the following detailed description where considered in conjunction with the accompanying drawings wherein:

FIG. 8 is a top plan view of a position alignment device;

FIG. 9 is a front view thereof;

FIG. 13 is a left side view of that shown in FIG. 12;

FIG. 14 is a sectional top plan view taken along line XIV—XIV in FIG. 12; and

DETAILED DESCRIPTION OF THE PREFERRED EMBODIMENTS

Figure 15:
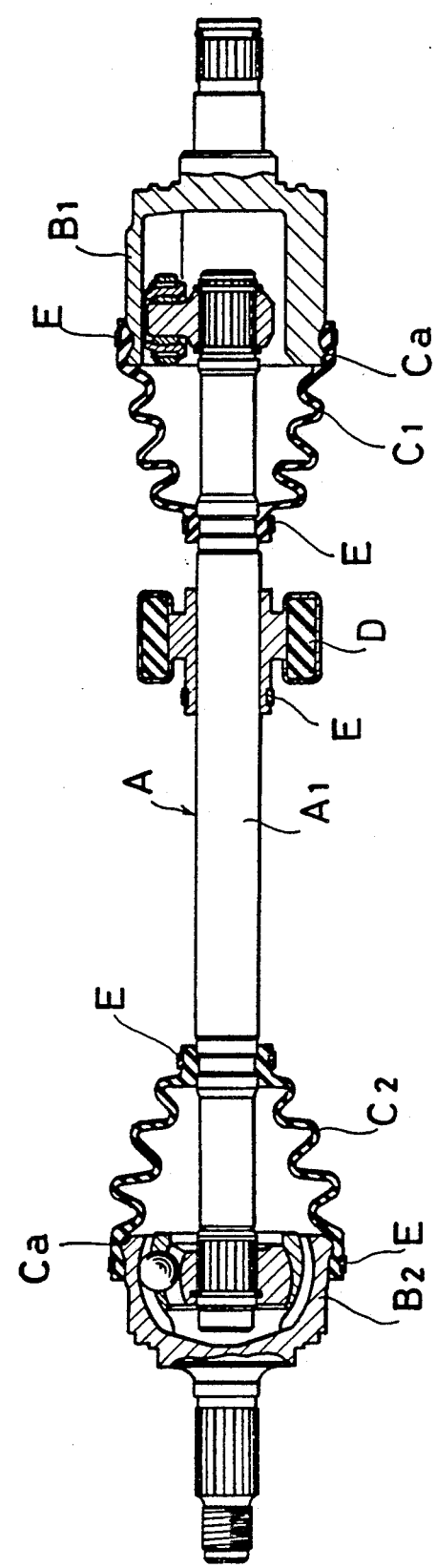
FIG. 15 is a longitudinal sectional view of a driving shaft.

As shown in FIG. 15, the illustrated example is one in which a boot C1 is fitted over the first joint B1 comprising a tripod type constant velocity joint attached to one end of the driving shaft A and another boot C2 is fitted over the second joint B2 comprising a bell type constant velocity joint attached to the other end of the driving shaft A. The diametrically larger end of each boot is fastened securely to the joint B1 or B2, and the diametrically smaller end thereof is fastened to the shaft body A1. In addition, a damper weight D is fitted onto the shaft body A1, all fastened by a steel band E wound tightly therearound.

Figure 1:
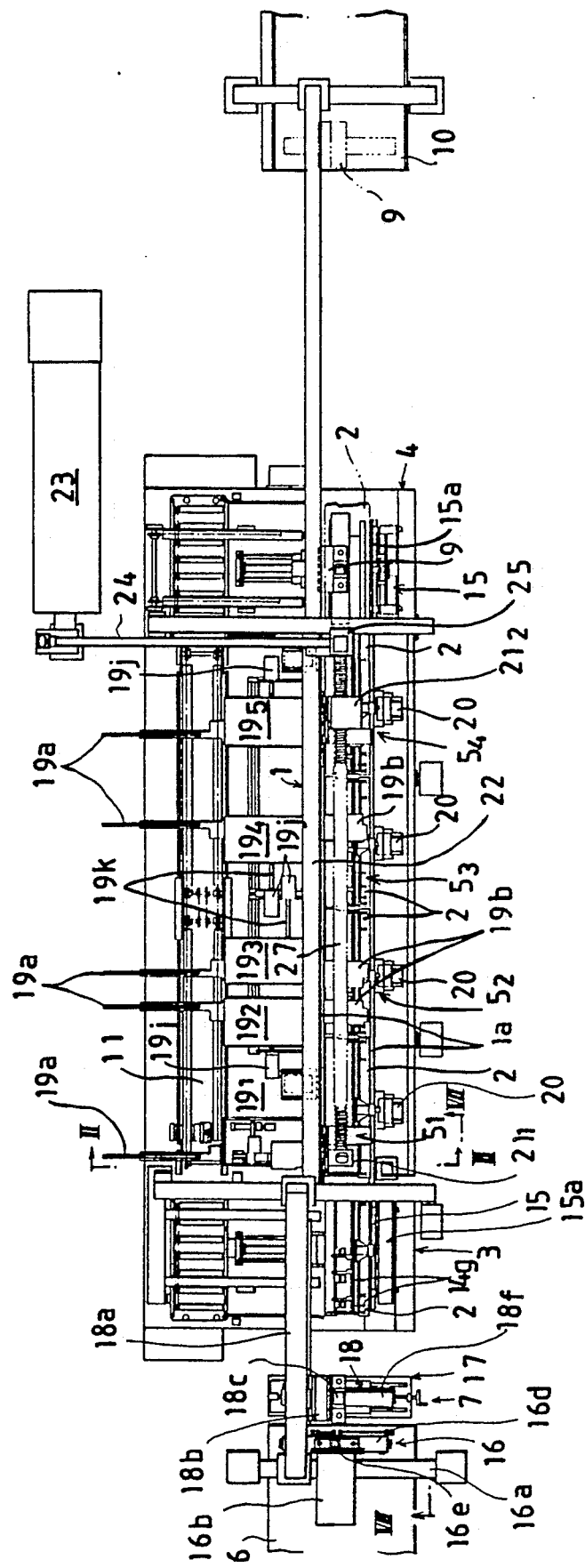
FIG. 1 is a top plan view of an embodiment of the present invention.
Figure 2:
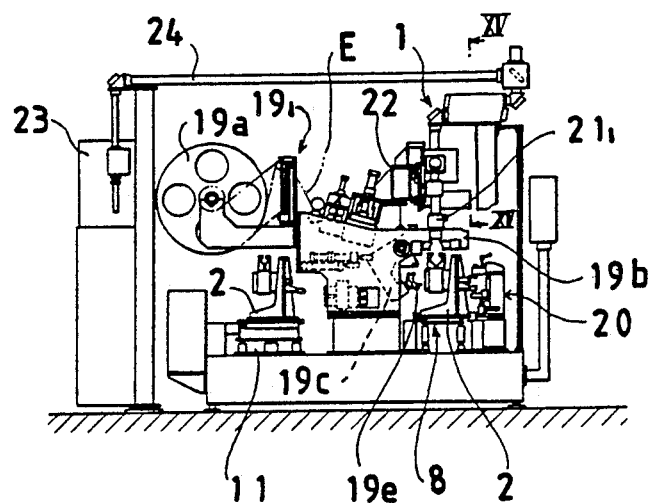
FIG. 2 is a front view thereof as seen from line II—II in FIG. 1.
Figure 7:
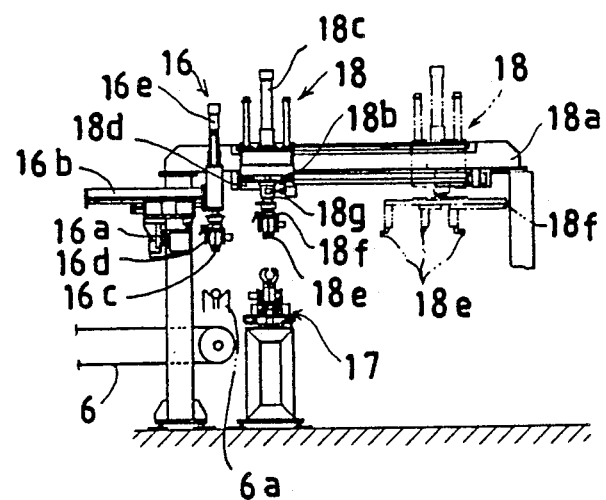
FIG. 7 is an enlarged side view of a relocation device as seen from line VII—VII in FIG. 1.

Referring to FIGS. 1 and 2, an assembly line 1 is provided along which a driving shaft A held on a conveying jig 2 is conveyed. Between a charging station 3 at the starting end of the assembly line 1 and a discharging station 4 at the final end of the assembly line 1 are provided a first to a fourth assembly stations $5_1$, $5_2$, $5_3$ and $5_4$. The driving shaft A being brought over by a conveyor 6 from an assembling device (not, shown) is transferred by a relocation device 7 onto the conveying jig 2 standing in the charging station 3. Using a transfer device 8, the conveying jig 2 is then conveyed to each of the assembly stations $5_1$, $5_2$, $5_3$, $5_4$ successively in that order. Fastening operations to fasten securely in place the diametrically larger end of the boot C2 for the second joint B2 are performed at the first assembly station $5_1$. Fastening operations to fasten securely in place the diametrically smaller end of each of the boot C2 for the second joint B2 and the other boot C1 for the first joint B1 are performed at the second assembly station $5_2$. Fastening operations to fasten securely in place the diametrically larger end of the boot C1 for the first joint B1 are performed at the third assembly station $5_3$. Fastening operations to fasten the damper weight D securely in place is performed at the fourth assembly station $5_4$. Thereafter, at the discharging station 4, a discharging device 9 is operated to remove the driving shaft A from the conveying jig 2 and discharge it onto a discharging conveyor 10 while the conveying jig 2 so emptied of the shaft A is returned to the charging station 3 through a return conveyor 11.

Figure 3:
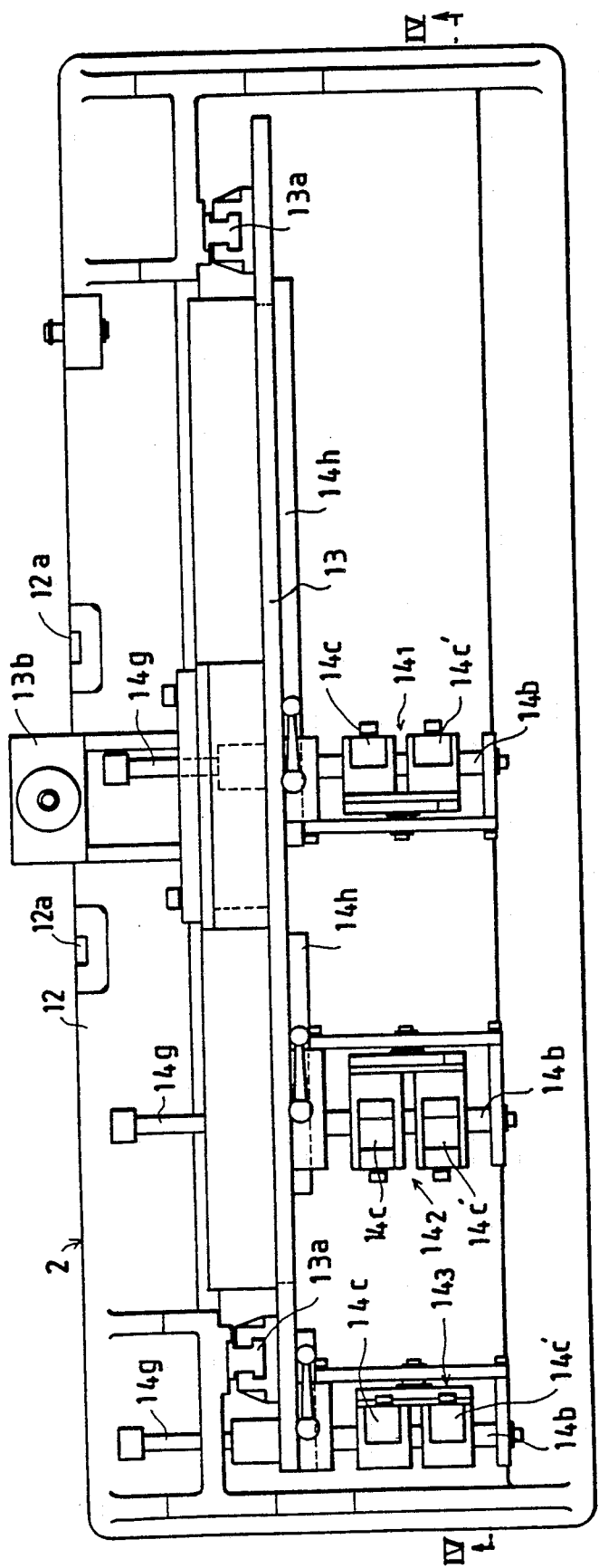
FIG. 3 is a top plan view of a conveying jig.
Figure 4:
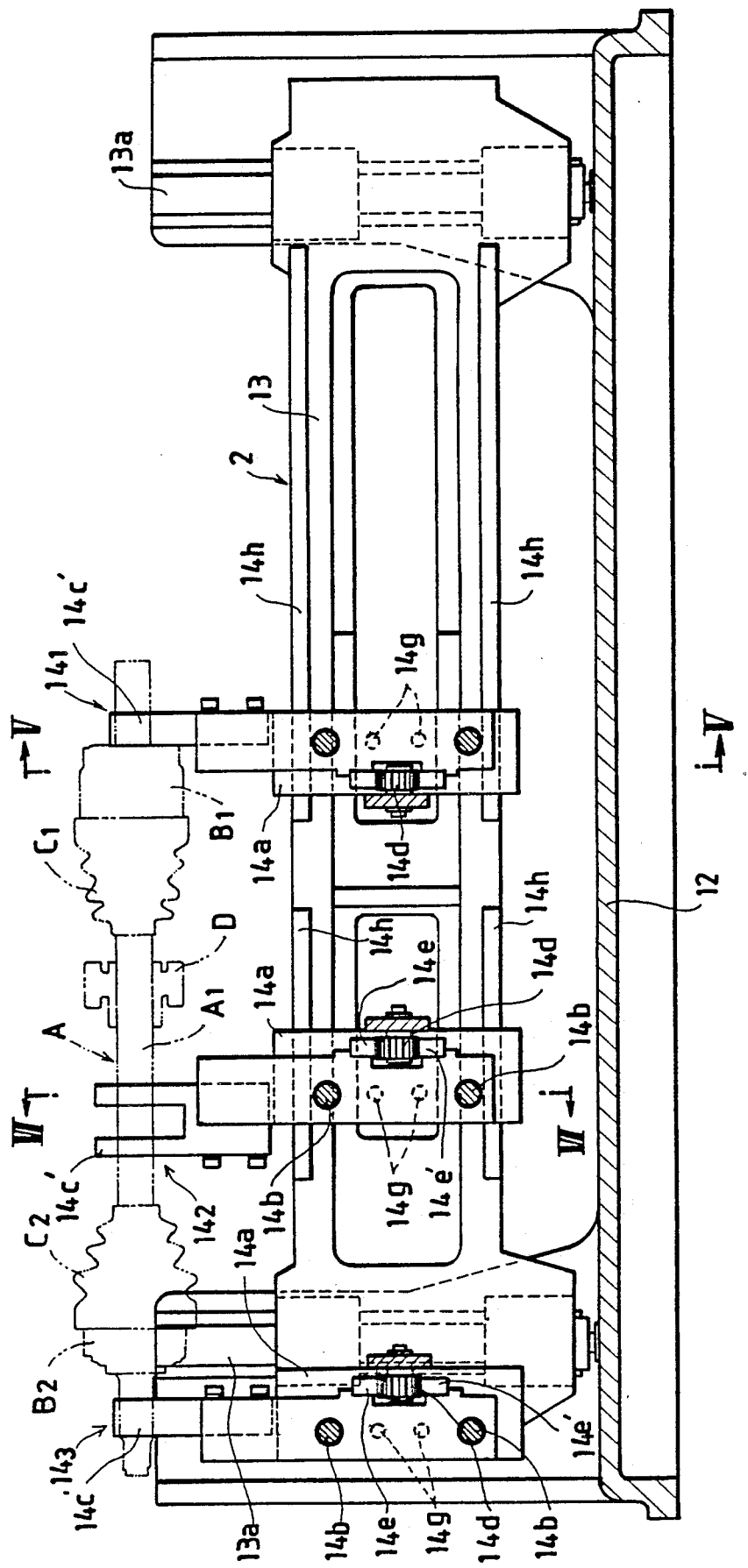
FIG. 4 is a sectional front view taken along line IV—IV in FIG. 3.
Figure 5:
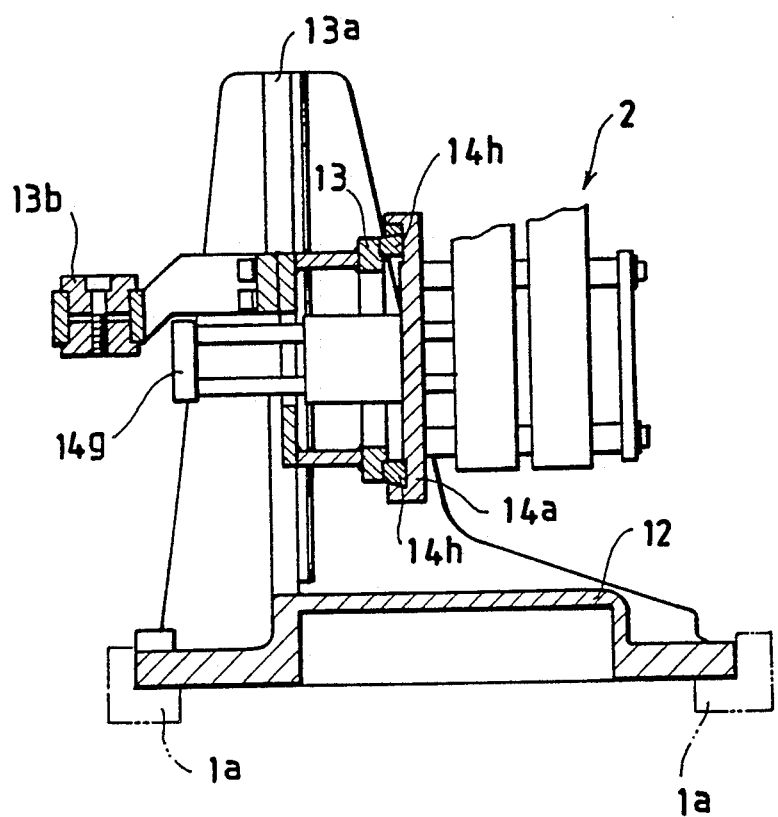
FIG. 5 is a sectional view taken along line V—V in FIG. 4.
Figure 6:
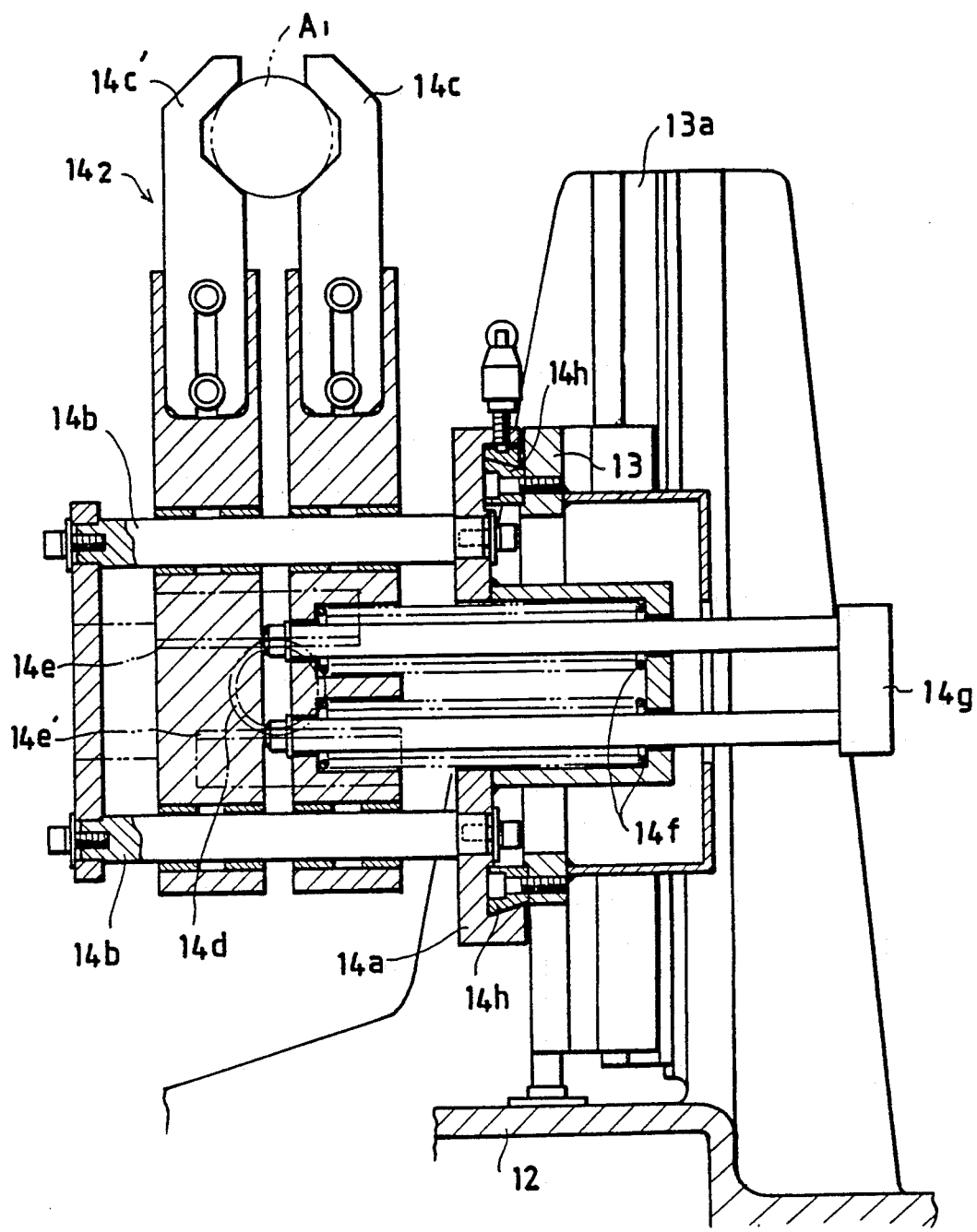
FIG. 6 is a section view taken along line VI—VI in FIG. 4.

As shown in FIGS. 3 through 5, the conveying jig 2 comprises: a jig body 12 which slidable along guide rails 1a, 1a laid on both 10 sides of the working line 1; a jig frame 13 extending longitudinally and supported on a pair of front and rear guide rails 13a, 13a fixed to the jig body 12 so as to be movable upward and downward therealong; and a first clamper $14_1$ for clamping a shank portion of the first joint B1, a second clamper $14_2$ for clamping the shaft body A1, and a third clamper $14_3$ for clamping a shank portion of the second joint B2, all of these clampers being mounted on the jig frame 13. As shown in FIG. 6, each of the clampers $14_1$, $14_2$ and $14_3$ has a pair of left and right clamp claws 14c, 14c' which are laterally slidably supported through a pair of upper and lower guide bars 14b, 14b on a holder 14a provided on the jig frame 13. A pair of upper and lower racks 14e, 14e' engaging with a pinion 14d pivotally supported on the holder 14a are respectively connected to both the clamp claws 14c, 14c' so as to enable both clamp claws 14c, 14c' to move laterally in a mutually synchronized fashion to open and close.

One of the clamp claws 14c is urged by a spring 14f toward the closing side so as to keep each of the clampers $14_1$, $14_2$ and $14_3$ normally held in the clamped position. A push member 14g is provided on the holder 14a which can push the other clamp claw 14c' toward the opening side. In addition, the charging station 3 and the discharging station 4 are each provided with an operating device 15 comprising a longitudinally extending push plate 15a which faces the push member 14g of each of the clampers $14_1$, $14_2$ and $14_3$ and is arranged to be movable back and forth in the lateral direction, so that each push member 14g may be pushed in by the push plate 15a to unclamp each of the clampers $14_1$, $14_2$ and $14_3$.

Furthermore, in order to be able to handle driving shafts A of different lengths, the first and the second clampers $14_1$ and $14_2$ are mounted in such a manner that they may be moved longitudinally along a guide rail 14h for positional adjustment with respect to the jig frame 13.

A pair of positioning blocks 12a are fixedly attached to the jig body 12. An operating arm 13b is fixedly attached to the jig frame 13 for lift operation.

As shown in FIGS. 1 and 2, the relocation device 7 comprises a first loader device 16 for receiving the driving shaft A from a work receiver 6a provided at the final end portion of the conveyor 6, a position alignment device 17 disposed between the conveyor 6 and the charging station 3, and a second loader device 18 for delivering the driving shaft A to the conveying jig 2. The first loader device 16 is arranged to comprise a machine frame 16a disposed above the final end portion of the conveyor 6, a slide frame 16b mounted on the machine frame 16a so as to be movable back and forth, three clampers 16c for clamping the driving shaft A detachably at the shank portions of the first and the second joints B1 and B2 and at the shaft body A1, a clamping head 16d extending lengthwise in the lateral direction and having the three clampers 16c thereon, with the clamping head 16d being mounted on the slide frame 16b in such a manner as to be moved upward and downward by a cylinder 16e. In the above arrangement, the clamping head 16d is caused to receive the driving shaft A from the work receiver 6a while the slide frame 16b is in its retreated state. Then, by movement of the slide frame 16b, the clamping head 16d is moved forward and downward to transfer the driving shaft A to the position alignment device 17. Further, the second loader device 18 is arranged to comprise a machine frame 18a extending longitudinally from a location above the position alignment device 17 to a location above the charging station 3, a slide frame 18b supported on the machine frame 18a so as to be movable back and forth, a lift frame 18d mounted on the slide frame 18b through a cylinder 18c, and a clamping head 18f equipped with three clampers 18e as is the foregoing clamping head 16d and hung from the lift frame 18d through a rotary actuator 18g so as to be turnable. In this arrangement, after turning the clamping head 18f to a sidewise-facing posture in which the lengthwise direction is in line with the lateral direction, the clamping head 18f is caused to receive the driving shaft A on the position alignment device 17 and then turned to a longitudinally-facing posture so as to have the first joint B1 of the driving shaft A positioned in front. In this condition, the clamping head 18f is moved to a location right above the charging station 3 and then moved downward so as to set the driving shaft A on the conveying jig 2 being returned to the charging station through the return conveyor 11. It should be noted here that the clampers 16c or 18e of each of the loaders 16 and 18 are so mounted as to be adjustable in position in order to be able to deal with different types of the shaft.

Figure 10:
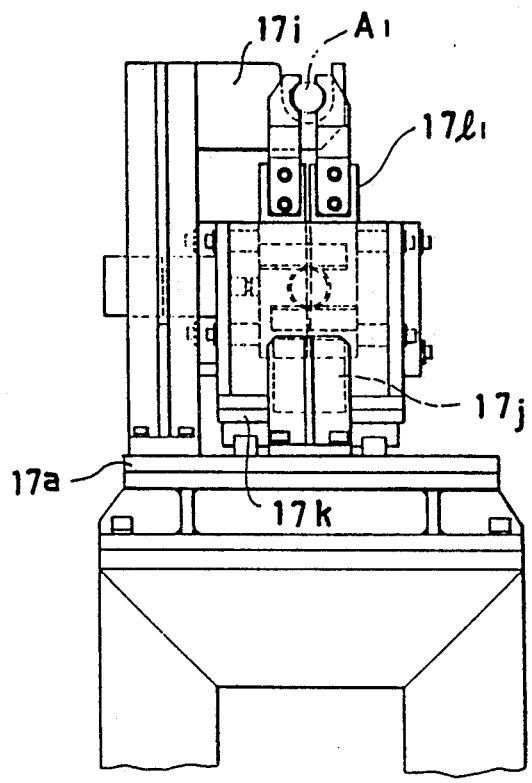
FIG. 10 is a left side view of that shown in FIG. 8.
Figures 11A, 11B:
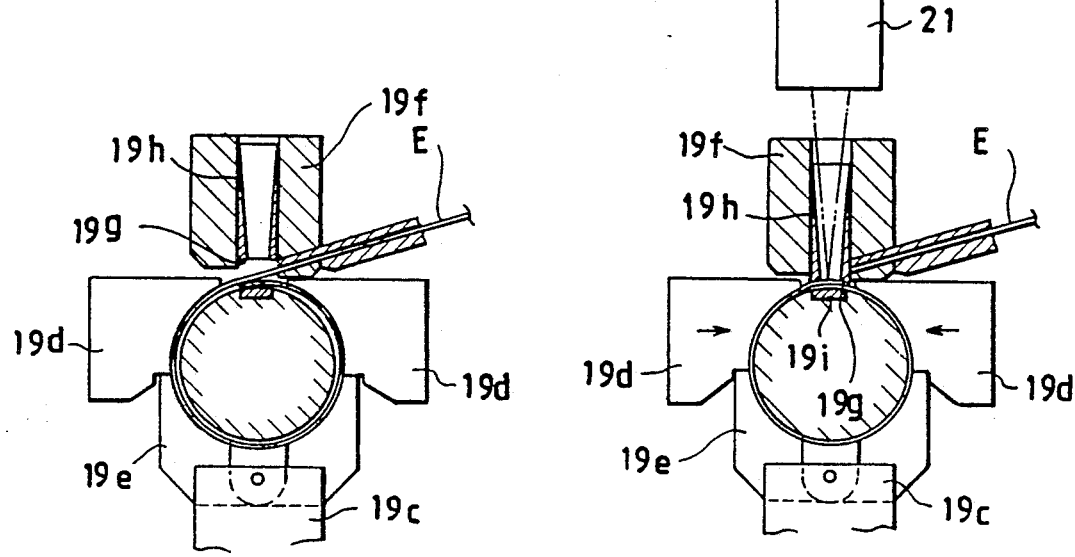
FIGS. 11a and 11b are each an explanatory diagram illustrating operation of a band winding device.

The foregoing position alignment device 17 is, as shown in FIGS. 8 through 10, arranged to comprise a first unit $17b_1$ for positioning the first joint B1, which is slidable with respect to the shaft body A1, and the boot C1, and a second unit $17b_2$ for positioning the second joint B2 and the boot C2, both units being mounted on a machine frame 17a. Thus, the diametrically smaller and larger ends of each of the boots C1 and C2 are correctly fitted over the joints B1 and B2 and the driving shaft body A1 respectively by these units $17b_1$ and $17b_2$ and at the same time each of the joints B1 and B2 is positioned thereby. In this manner, it functions to provide position alignments for the diametrically smaller and larger ends of each of the boots C1 and C2.

In order to be able to deal with possible model changes of the shaft, the foregoing first unit $17b_1$ is arranged to comprise a base plate 17d mounted on the machine frame 17a in such a manner as to be advanced and retreated for position adjustment by operation of a control bolt 17c having a handle, a stopper 17e fixedly mounted on the base plate 17d to receive the end surface of the first joint B1, a slide table 17g mounted on the base plate 17d so as to be advanced and retreated by a cylinder 17f, a first clamper $17h_1$ mounted securely on the table for clamping the shank portion of the first joint B1, and a second clamper $17h_2$ also mounted on the table 17g for clamping the boot C1, with the second clamper being movable back and forth by a driving source (not shown). Furthermore, the foregoing second unit $17b_2$ is arranged to comprise a stopper 17i for receiving the end surface of the second joint B2, the stopper being fixedly mounted on the machine frame 17a, a slide table 17k mounted on the machine frame 17a and moved back and forth by a cylinder 17j, a pair of first clampers 17l, $17l_1$ fixedly mounted on the slide table 17k and used for clamping the shank portion of the joint B2 and the shaft body A1, and a second clamper $17l_2$ for clamping the boot C2 being mounted on the slide table 17k in such a manner as to be moved back and forth by a driving source (not shown). In this arrangement, each of the driving shafts A brought in by the first loader device 16 is clamped at the shank portion of each of the joints B1 and B2 and the shaft body A1 thereof by the first clampers $17h_1$ and $17l_1$ of both units $17b_1$ and $17b_2$. Then, the slide tables 17g and 17k of the respective units $17b_1$ and $17b_2$ are moved outwardly along the axial line of the driving shaft A so as to have each of the joints B1 and B2 properly positioned by bringing the end surfaces of the joints B1 and B2 to abut against the stoppers 17e and 17i respectively. Next, the boots C1 and C2 are clamped respectively with the second clampers $17h_2$ and $17l_2$ of the respective units $17b_1$ and $17b_2$. Then, each of the second clampers $17h_2$ and $17l_2$ is moved outwardly along the axial line, so that a stepped portion Ca on the inner periphery of the diametrically larger end portion of each of the boots C1 and C2 may hit the open end of each of the joints B1 and B2 so as to position each of the boots C1 and C2 with respect thereto.

Since the open end of the second joint B2 is somewhat round-shaped, the stepped portion Ca of the boot C2 being fitted over the second joint B2 is pushed sometimes too far along the outer peripheral portion of the second joint B2 as the boot C2 is pushed by the movement of the second clamper $17l_2$. In order to avoid such from occurring, an embodiment of the present invention shown in the drawings has a boot stopper $17m$ provided on the slide table $17k$ so as to receive and stop the leading end surface of the diametrically larger end of the joint B2, with the stopper $17m$ being designed to be opened and closed as desired.

As described in the foregoing, the driving shaft A can be positionally adjusted so that it may be accurately positioned and set on the conveying jig 2 through the second loader device 18 having each of the boots C1 and C2 disposed at the predetermined positions with respect thereto.

Each of the foregoing assembly stations $5_1$ through $5_4$ is provided with a band winding device. Namely, the first assembly station $5_1$ is provided with a first band winding device $19_1$ suitable for band winding on the diametrically larger end portion of the boot C2 for the second joint B2; the second assembly station $5_2$ is provided with two units of the band winding device including a second band winding device $19_2$ suitable for the diametrically smaller end of the boot C2 for the second joint B2 and a third band winding device $19_3$ suitable for the diametrically smaller end of the boot C1 for the first joint B1; the third assembly station $5_3$ is provided with a fourth band winding device $19_4$ suitable for the diametrically larger end of the boot C1 for the first joint B1; and the fourth assembly station $5_4$ is provided with a fifth band winding device $19_5$ suitable for the damper weight D. In addition, each of the assembly stations $5_1$ through $5_4$ is provided with a positioning device 20 for positioning the conveying jig 2 and then lifting up the driving shaft A to a predetermined position, so that a band winding operation is performed by each band winding device while the driving shaft A is held lifted up.

Each band winding device, as shown in FIG. 2, has a winding head $19b$ for supplying a band E being drawn out from a band coil $19a$, and arm $19c$ pivotally supported on the winding head $19b$ which is swung upwards from an escape position below after the driving shaft A has been lifted up. In this manner, the portion to be wound therearound with the band E may be surrounded by a pair of left and right guide pieces $19d$, $19d$ provided on the winding head $19b$ and another guide piece $19e$ attached to the arm $19c$ in such a manner as to leave a clearance therebetween shown in FIG. $11a$. The band E is then fed in through this clearance to be wound for a little over on round around the outer periphery of the portion to be wound therearound with the band E. The band E is then tightened in place by these guide pieces $19d$ and $19e$ while a pressor member $19h$ provided with a cutting edge $19g$ and inserted in a guide sleeve $19f$ is moved downward for cutting the band E. After cutting the band E as above, the overlapped portion of both ends of the band E is irradiated with laser beams emitted from a laser irradiation head 21 which will be discussed later, the laser beams being applied to the overlapped portion through an irradiation hole formed in the pressor member $19h$, thereby welding the band E. A back bar $19i$ is mounted on the winding head $19b$ so as to be movable back and forth along the axial line of the shaft A and supports the overlapped portion thereof from inside.

The foregoing arrangement of the band winding device is not particularly different from that disclosed in the Japanese Unexamined Utility Model Registration Application No. Jikkaisho 58-146630, so that any further detailed description thereof is omitted.

In this embodiment of the present invention, the second through the fifth band winding devices, $19_2$ to $19_5$, are arranged to be moved back and forth through the control bolt $19k$ by each of the motors $19j$ as shown in FIG. 1 so that their positions may be changed according to the type of the shaft A.

Figure 12:
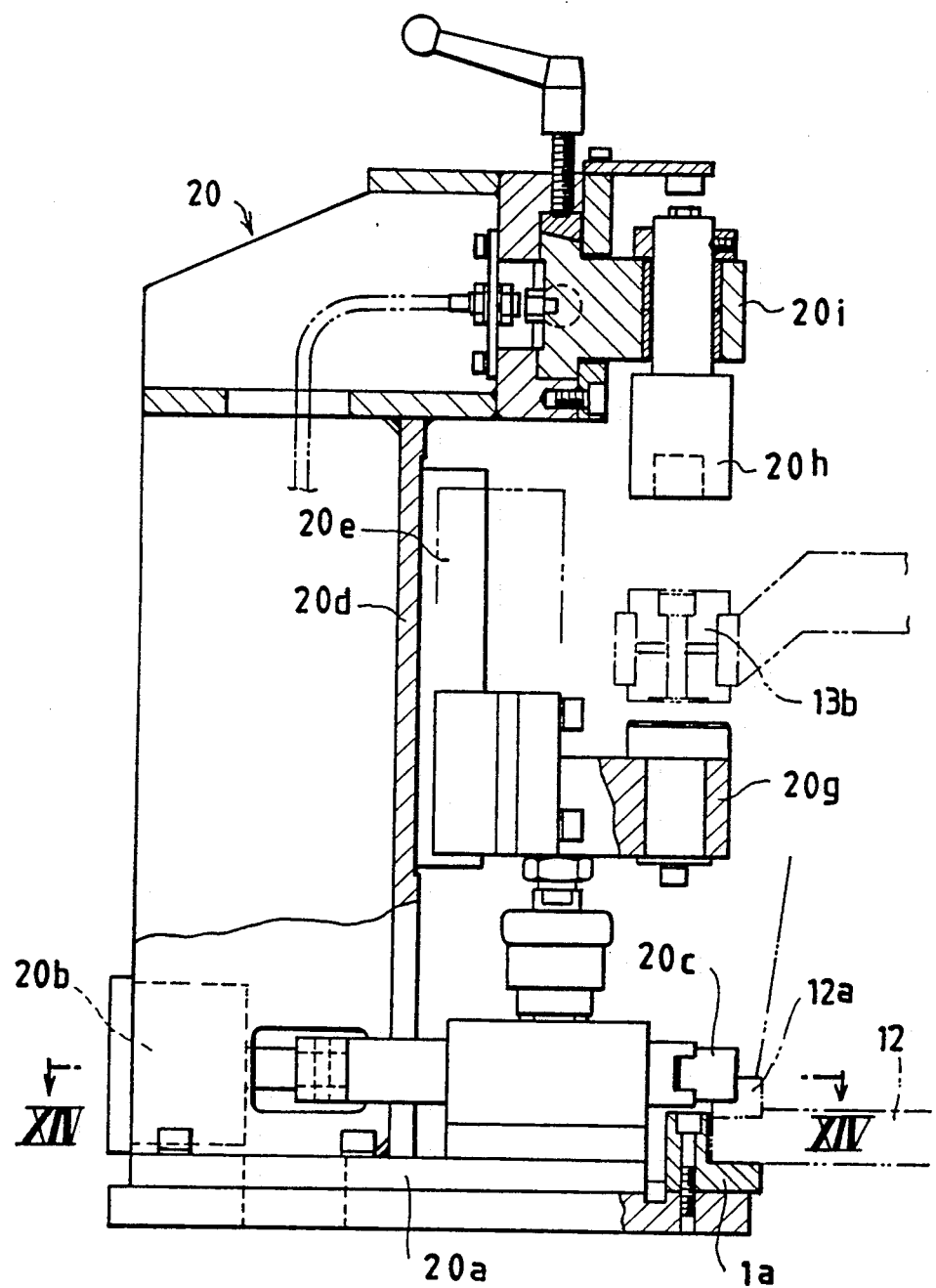
FIG. 12 is a front view of a positioning device provided at an assembly station.

The foregoing positioning device 20 is, as shown in FIGS. 12 through 14, arranged to comprise: a machine base 20 disposed outside of the guide rail $1a$ on one side of the working line 1; a pair of positioning pins $20c$, $20c$ mounted on the machine base $20a$ and movable back and forth in the lateral direction by a cylinder $20b$; a lifter $20g$ mounted to be moved upward and downward by a cylinder $20f$ along a guide rail $20e$ securely attached to a support column $20d$ erected on the machine frame $20a$; and a stopper $20h$ attached to the upper end of the support column $20d$. In this arrangement, each of the positioning pins $20c$ is advanced inwardly in the lateral direction to be engaged with each positioning block $12a$ securely mounted on the jig body 12 of the conveying jig 2, thereby positioning the conveying jig 2. Next, the lifter $20g$ is moved upward to push up the jig frame 13 of the conveying jig 2 through the operating arm $13b$ until the arm $13b$ comes to abut against the stopper $20h$, so that the driving shaft A supported on the jig frame 13 through the clampers $14_1$, $14_2$ and $14_3$ is lifted up to the predetermined position.

When the shaft diameter and/or joint diameter of a driving shaft are changed due to change in type thereof, it is necessary to change the liftup position of the driving shaft A in accordance with the change. To meet this need, according to the present embodiment of this invention, two stoppers $20h$, $20h$ which are different in height from each other are mounted on a slider $20i$ attached to the upper end of the support column $20d$ so that the stoppers $20h$, $20h$ may be selectively moved to and set at their operating positions matching the position of the lifter $20g$.

Furthermore, two laser beam irradiation heads are provided on the assembly line, a first irradiation head $21_1$ and a second irradiation head $21_2$, both of which are movable back and forth. The first laser beam irradiation head $21_1$ is moved to a position at which it is aligned with one of the first and the second band winding devices $19_1$, $19_2$ and then the second laser beam irradiation head $21_2$ is moved to a position at which it is aligned with one of the third through the fifth band winding devices, $19_3$, $19_4$, $19_5$, the movement of the first later beam irradiation head $21_1$ being made alternately with that of the second laser beam irradiation head $21_2$. A laser beam emitted from a laser beam generator 22 is led alternately into each of the laser beam irradiation heads $21_1$, $21_2$ so that the two irradiation heads $21_1$, $21_2$ can take care of welding the overlapped portions of the band E wound by the five band winding devices $19_1$ through $19_5$ according to the above-described allotment of the welding work.

Now, the overall operation of this embodiment of the present invention will be explained in the following:

The driving shaft A brought in by the conveyor 6 is set on the position alignment device 17 by the first loader device 16 and positionally aligned by the position alignment device 17 so that each of the joints B1, B2 and each of the boots C1, C2 may be positioned respectively as their predetermined positions with respect to the shaft A. Then, in this condition, the driving shaft A is set by the second loader device 18 on the conveying jig 2 standing in the charging station 3.

Next, the conveying jig 2 on the assembly line is moved therealong successively to the assembly stations and positioned properly at each of the assembly stations $5_1$ through $5_4$ by the positioning device 20 at each station while the driving shaft A is lifted up to its predetermined position through the jig frame 13 by the lifter 20g provided in each positioning device 20. Next, a band E is wound around each of the predetermined tight-binding portions by each of the band winding devices $19_1$ through $19_5$. More specifically, the first band winding device $19_1$ is used to wind a band E around the diametrically larger end portion of the boot C2 for the driving shaft A positioned in the first assembly station $5_1$, the second and the third band winding device $19_2$, $19_3$ are used to wind bands E around the diametrically smaller end portions of the boots C2 and C2 for the driving shaft A positioned in the second assembly station $5_2$, the fourth band winding device $19_4$ is used to wind a band E around the diametrically larger end portion of the boot C1 for the driving shaft A positioned in the third assembly station $5_3$, and the fifth band winding device $19_5$ is used to wind a band E around the damper weight D fitted over the driving shaft A positioned in the fourth assembly station $5_4$.

In the foregoing operation, each conveying jig 2 keeps on holding the driving shaft A thereon in such a manner that each of the joints B1, B2 and the shaft body A1 may be held fast by the clampers $14_1$, $14_2$, $14_4$ attached to the jig frame 13 so as not to move in the axial direction of the shaft while the diametrically smaller and larger end portions of each of the boots C1, C2 are kept positioned respectively at the predetermined positions with respect to each conveying jig 2 as in the same condition in which they are positionally aligned by the position alignment device 17. Thus, at each of the assembly stations, the diametrically smaller and larger end portions of each of the boots C1, C2 are accurately aligned in position with the corresponding band winding devices for carrying out the band winding operation without an error.

Next, each band E wound on by each of the band winding devices $19_1$ through $19_5$ as above is welded by means of one of the two laser beam irradiation heads $21_1$, $21_2$. Then, the jig frame 13 of each conveying jig 2 is moved downward and each conveying jig 2 is conveyed to the next assembly station to complete one cycle of operation.

As described in the foregoing, according to the present invention, the driving shaft is held on the conveying jig in such a condition that it is positioned to have the diametrically smaller and larger end portions of each of the boots attached to both end portions thereof accurately fitted over the shaft body and each of the joints and held at the predetermined positions. The conveying jig is conveyed successively to a plurality of assembly stations to wind a band accurately and tightly around the diametrically smaller and larger end portions of each of the boots, using the band winding device disposed at each of the assembly stations, thereby fastening them securely in place. This enables the boot-fastening operation to be performed automatically with higher work efficiency, which is one of the advantageous effects brought about by the present invention.

Further according to the present invention, the driving shaft can be moved upward and downward at each of the assembly stations through the jig frame provided on the conveying jig, so that the jig body of the conveying jig itself need not be moved upward and downward. This leads to structural simplification of the conveying means.

According to the present invention, the driving shaft can be accurately aligned in position so that the diametrically smaller and larger end portions of each of the boots may be fitted accurately over the shaft body and each of the joints and held at their predetermined positions. Still further, according to the present invention, accuracy in positional alignment of the boots can be further improved.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. Ana apparatus for securely fastening boots to a driving shaft having a shaft body in which a boot of said boots is fitted over each end of the opposite ends of said driving shaft so as to cover an open end of a joint attached to each end of said driving shaft, and a band is wound around each of the opposite ends of the boot by a band winding device for fastening opposite ends of the boot securely to said shaft body of said driving shaft and said joint respectively, said apparatus comprising:

an assembly line along which said driving shaft is conveyed by a conveying jig while being held thereon; said conveying jig being movable along said assembly line and having clampers for clamping a shank portion of each of said joints and said shaft body;

said assembly line having a charging station at a starting end thereof to which said conveying jig is returned by a return conveyor from a discharging station at a final end of said assembly line and a plurality of assembly stations, each of said assembly stations having at least one band winding means for winding a band around one of said both ends of the boots, and a positioning means for positioning said conveying jig at each of said assembly stations; a loader means for setting said driving shaft on said conveying jig returned to said charging station; and a position alignment means for positionally aligning said driving shaft with each of said joints and each of said boots positioned respectively at predetermined positions with respect thereto, said driving shaft so positionally aligned by said position alignment means being set on said conveying jig in said aligned state through said loader means.

2. An apparatus for securely fastening a boot to a driving shaft according to claim 1, wherein said conveying jig is provided with a vertically movable jig frame, said jig frame being provided with said clampers, and said positioning means is provided with a lifter for moving the jig frame upward and downward.

* * * * *